United States Patent
Johnston

(10) Patent No.: US 10,996,042 B2
(45) Date of Patent: May 4, 2021

(54) MEASURING DEVICE

(71) Applicant: Grant Johnston, Ferndale, MI (US)

(72) Inventor: Grant Johnston, Ferndale, MI (US)

( * ) Notice: Subject to any disclaimer, the term of this patent is extended or adjusted under 35 U.S.C. 154(b) by 292 days.

(21) Appl. No.: 16/268,001

(22) Filed: Feb. 5, 2019

(65) Prior Publication Data

US 2019/0242684 A1    Aug. 8, 2019

Related U.S. Application Data

(60) Provisional application No. 62/626,214, filed on Feb. 5, 2018.

(51) Int. Cl.
*B43L 7/00* (2006.01)
*G01B 3/00* (2006.01)
*G01B 5/02* (2006.01)

(52) U.S. Cl.
CPC .............. *G01B 3/002* (2013.01); *G01B 5/02* (2013.01)

(58) Field of Classification Search
CPC ...................................................... G01B 3/002
USPC .................................. 33/484, 492, 760, 770
See application file for complete search history.

(56) References Cited

U.S. PATENT DOCUMENTS

| | | | | |
|---|---|---|---|---|
| 2,307,892 A * | 1/1943 | Lowther | ................... | B44C 7/08 33/382 |
| 3,545,091 A * | 12/1970 | Sebastiani | ................ | G01C 9/34 33/372 |
| 3,896,554 A * | 7/1975 | Pacion | ..................... | G01B 3/04 33/489 |
| 4,495,709 A * | 1/1985 | Mainenti | .................. | G01B 3/04 33/484 |
| 5,471,749 A * | 12/1995 | Brady | ..................... | B26B 29/06 33/484 |
| 6,305,093 B1 * | 10/2001 | Venola | .................... | A47G 1/205 33/451 |
| 6,463,666 B1 * | 10/2002 | Szumer | ..................... | G01B 3/02 33/451 |
| 6,523,272 B1 * | 2/2003 | Morales | ................... | B25H 7/02 33/42 |
| 6,973,733 B2 * | 12/2005 | Levine | .................... | B43L 7/007 33/451 |
| 7,171,757 B1 * | 2/2007 | Stoneberg | ............... | B43L 7/007 33/458 |
| 8,434,235 B2 * | 5/2013 | Carter | .................... | B26B 29/02 30/293 |
| 2014/0007443 A1 * | 1/2014 | Orman | ................... | A01K 97/00 33/701 |
| 2015/0201866 A1 * | 7/2015 | Wojcieszak | .............. | A43D 1/04 33/512 |
| 2015/0354933 A1 * | 12/2015 | Moss | ........................ | E04C 2/00 52/105 |

* cited by examiner

*Primary Examiner* — George B Bennett
(74) *Attorney, Agent, or Firm* — Dinsmore & Shohl LLP

(57) ABSTRACT

A measuring device having a flange extending from a rule portion at one end and an ergonomic module on the other end. The ergonomic module has side surfaces which angle at the same angle as side edges of the flange to permit the measuring device to be supported on the side surfaces during use. A magnet may be encapsulated in the ergonomic module for supporting the measuring device when not in use. A thumb depression is formed in the ergonomic module to facilitate use by the user.

6 Claims, 3 Drawing Sheets

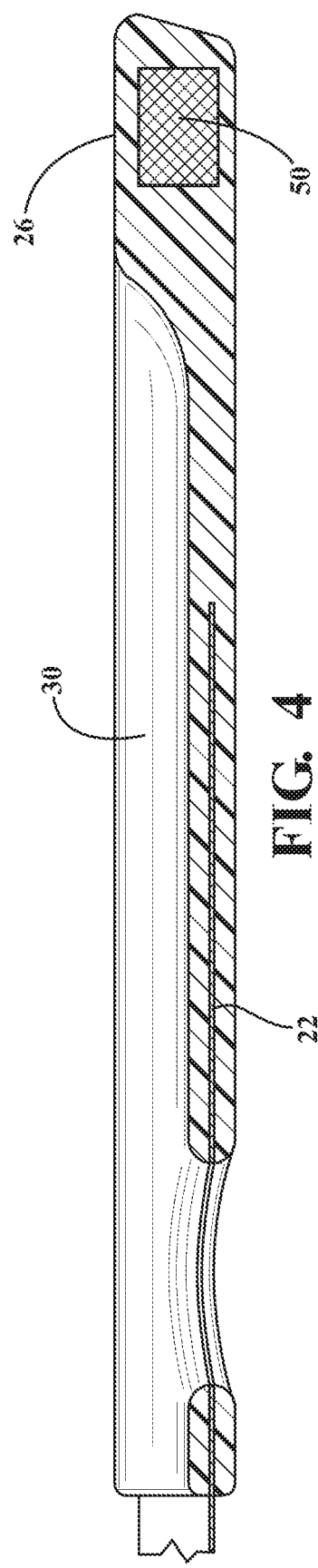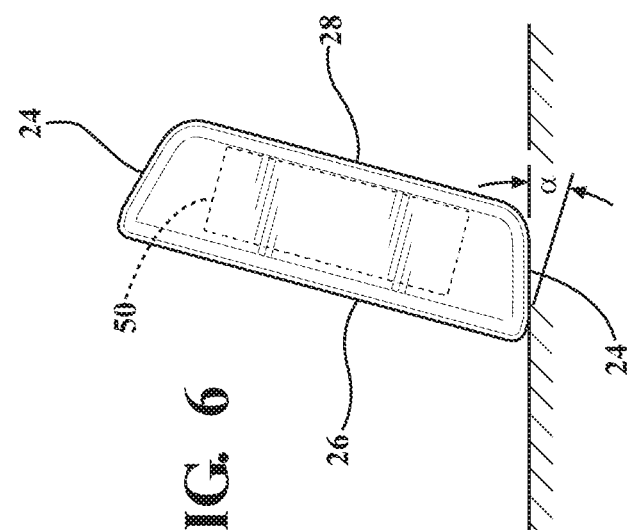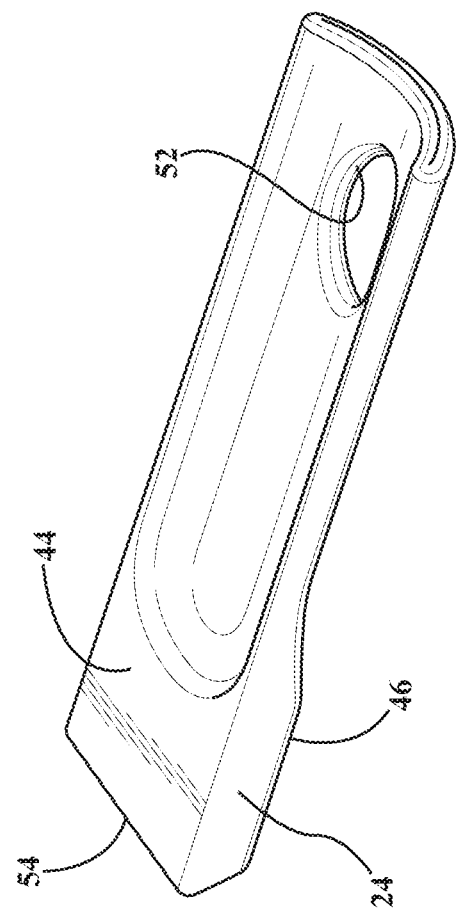

US 10,996,042 B2

MEASURING DEVICE

CROSS-REFERENCE TO RELATED APPLICATIONS

This Application claims the benefit of U.S. Provisional Application 62/626,214 filed on Feb. 5, 2018.

FIELD OF THE INVENTION

A measuring device for measuring length, more particularly, a measuring device which can be set on or along a work piece to be measured.

BACKGROUND OF THE INVENTION

Measuring devices for measuring length of a work piece are well known. These devices include rulers, yardsticks and measuring tapes. Such devices generally have gradation markings or markings at regular intervals along one or both edges. These devices are typically used by holding the measuring device in one hand and placing the gradation markings adjacent to a work piece. However, the devices are cumbersome to store and not conveniently used in many applications.

SUMMARY OF THE INVENTION

A measuring device for measuring linear distance includes an elongated body with a rule portion extending between an ergonomic portion and a flange. The rule portion has a pair of spaced apart edges with graduating markings along at least one edge. The flange is mounted at one end of the rule portion and an ergonomic module is formed at another end. The flange has trapezoidal profile with a pair of angled side edges. The ergonomic module has a pair of side portions which angle inwardly from a top to a bottom at the same angle as the side edges of the flange so that the measuring device may be set on one side portion and one during measuring.

The measuring device may include the magnet which is mounted to the ergonomic module to allow the measuring device to be magnetically supported for storage. The ergonomic module also includes a depression which extends in axial direction towards the rule portion in order to accommodate the thumb of the user. In the preferred embodiment, the rule portion has an arcuate shape to permit clear view when the measuring device is set on its side portions.

BRIEF DESCRIPTION OF THE DRAWINGS

FIG. 4 is a cross-section view of the ergonomic module.

FIG. 5 is a perspective view of the ergonomic module in accordance with the invention; and FIG. 6 is an end view of the ergonomic module in accordance with the invention.

DETAILED DESCRIPTION OF THE PREFERRED EMBODIMENTS

Figure 1:
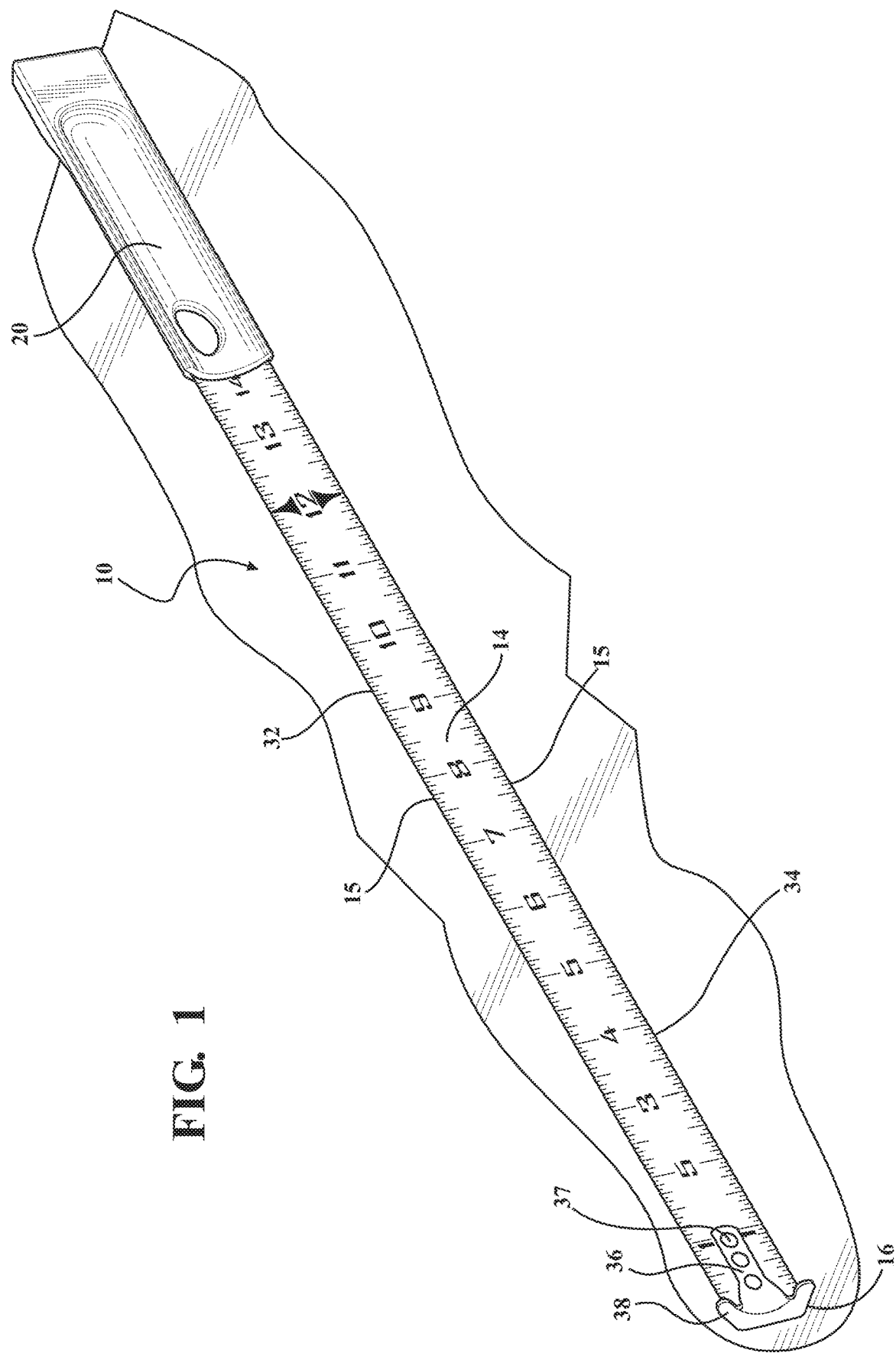
FIG. 1 is a perspective view of the measuring device in accordance with the invention.
Figure 3:
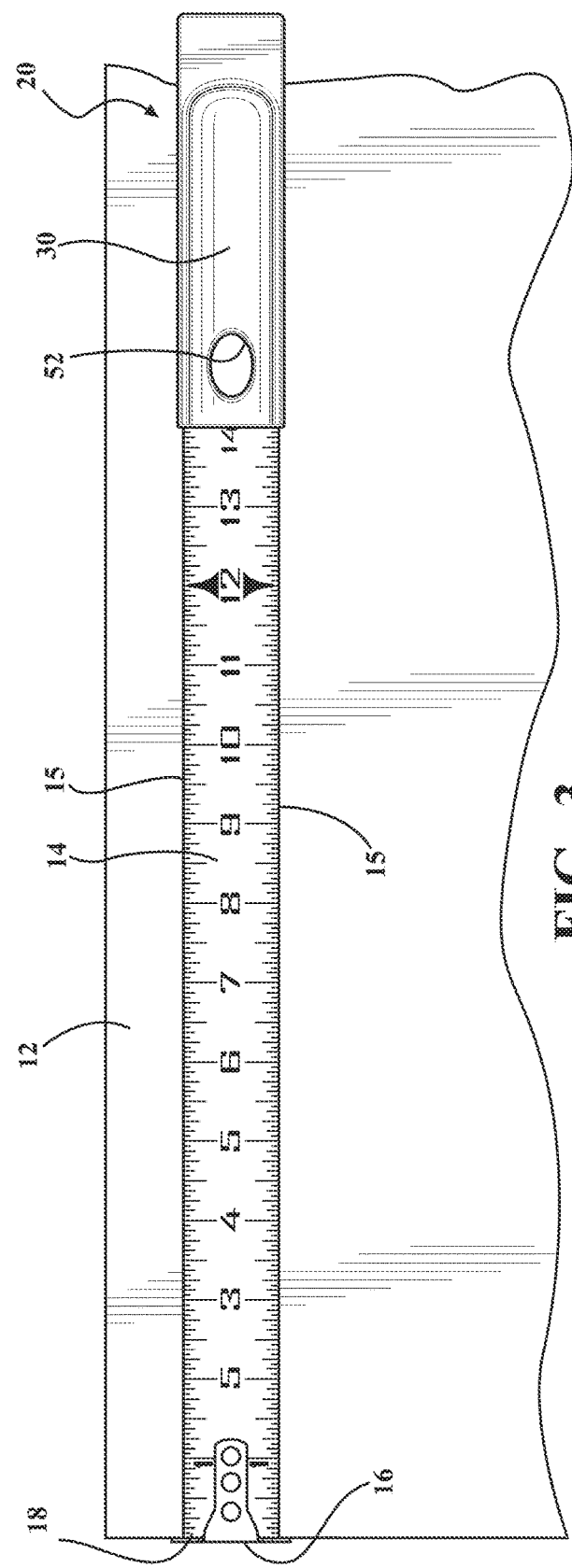
FIG. 3 is a top view of the measuring device in accordance with the invention.

An improved measuring device 10 for measuring linear distances of a work piece is best shown in FIGS. 1 and 3.

Figure 2:
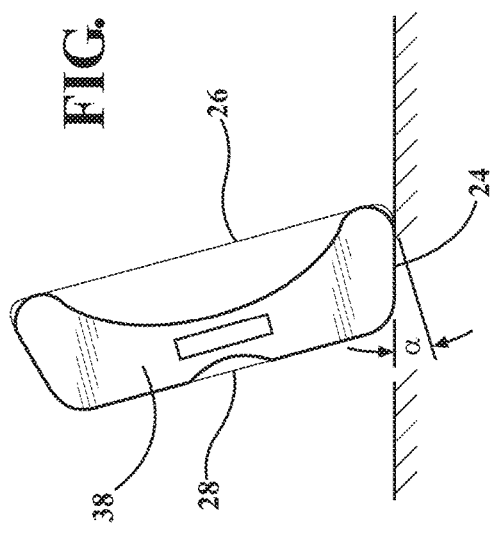
FIG. 2 is an end view showing the flange positioned on a support surface in accordance with the invention.

The measuring device 10 has an elongated rule portion 14 with gradation markings 15. A trapezoidal abutment flange 16 is mounted at one end 18 of the rule portion 14 and an ergonomic module 20 is formed at an opposite end 22. The ergonomic module 20 has side support surfaces 24 which taper inwardly from a top 26 of the module to a bottom 28 of the module 20. Advantageously, the measuring device 10 can be used by placing the measuring device 10 on one of the support surfaces 24 as shown in FIG. 2. The ergonomic module 20 includes an ergonomically shaped depression 30 formed to accommodate a user's thumb to facilitate use.

As shown in FIG. 1, the rule portion 14 has a top surface 32 extending between a pair of side edges 34. The gradation markings 15 are formed on the top surface 32 at regular intervals along the side edges 34. The markings 15 may be in any suitable scale, such as inches or meters. The markings 15 may be formed in a suitable manner such as printing. The rule portion 14 may be formed with an arcuate cross section from metal such as spring steel. Alternatively, the rule portion may be formed from a molded material with a rectangular cross section.

The flange 16 is mounted at one end 18 of the rule portion 14. The flange has profile. The flange may be formed with a tab portion 36 that extends normally from the flange 16. The tab portion 36 may be affixed to the rule portion 14 with rivets 37. An upper portion 40 has the flange extends between the side edges 34 of the rule portion 14. The flange has side edges 38 which taper inwardly at an angle "α" from the upper portion 40 to a bottom 42. (FIG. 2) In the preferred embodiment, the angle "α" is generally about 15 degrees. The flange may abut against the work piece 12 or may be used to hook the work piece 12 during the measuring process as shown in FIG. 3.

As shown in FIGS. 1, 4 and 5, the ergonomic module 20 is formed at the opposite end 22 of the rule portion 14. The preferred embodiment, the ergonomic module 20 is formed of a moldable material, such as thermal plastic. A suitable thermal plastic is buna-n. The module 20 has a top 44, bottom 46 and the pair of side support surfaces 24. The support surfaces 24 angle inwardly from the top 44 to the bottom 46 at the same angle "α" as the side edges 38 of the flange (FIG. 6). Each side support surface 24 and a respective side edge 38 of the flange 16 extend on a same plane, so that the measuring device may rest on the support surface 24 and side edge 38 with the gradation markings 15 directly adjacent to the work piece 12. (FIG. 3) The arcuate shape of the rule portion 14 permits a clear line site to the gradation markings 15 and portions of the work piece 12 to be measured The height of the support surface may be the same as a height of the flange or may be greater to provide the necessary support.

As shown in FIGS. 3-5, the depression 30 to accommodate a thumb extends into the top 44 of the ergonomic module. The depression 30 is spaced inwardly from end 54 of the module and extends axially to the rule portion 14. The depression 30 has a width, a depth and a radius of curvature which will accommodate to a thumb of the user. The depression 30 facilitates the holding of the measuring device 10 while being used in the measurement process.

As Shown in FIGS. 2 and 4 a magnet 50 may be mounted to or overmolded into the ergonomic module. Any suitable magnet having sufficient flux to support the rule magnetically on a metal surface may be used. The measuring device 10 can thus be stored by attaching the device to a machine adjacent to the work area or any metal surface. An aperture 52 extends through the ergonomic module from top to bottom to accept a hook for hanging with like as an alternative method of storage.

Thus disclosed, is an easily used measuring device which is also easily stored. One skilled in the art will recognize there are variations which one within the scope of the invention.

The invention claimed is:

1. A measuring device for measuring a workpiece by a user, the measuring device comprising:
   an elongated rule portion extending between a pair of ends, the rule portion has a top extending between a pair of edges, the top having gradation marking formed adjacent the side edges;
   a flange mounted to one of the pair of ends, the flange has a pair of angled side edges; and
   an ergonomic module formed at another of the pair of ends, the module having a top, bottom, and pair of side surfaces which angle inwardly from the top to the bottom, wherein the device may be freely supported on one of the side surfaces for use in measuring a workpiece.

2. The measuring device of claim 1 further comprising:
   a magnet mounted within the ergonomic module.

3. The measuring device of claim 1, wherein the ergonomic module further comprises:
   a depression extending axially for accepting a thumb of the user.

4. The measuring device of claim 1, wherein the ergonomic module has an aperture extending from the top through the bottom for hanging.

5. The measuring device of claim 1, wherein respective ones of one side of the ergonomic module and one side of the flange angle inwardly from the top to the body to the bottom of the body at the same angle.

6. The measuring device of claim 1, wherein the rule portion has an arcuate cross section.

* * * * *